United States Patent [19]

Soeller

[11] 3,817,127

[45] June 18, 1974

[54] MACHINE FOR SHEARING AND STRIPPING CABLE INSULATION

[75] Inventor: Richard Soeller, Beaverton, Oreg.

[73] Assignee: Tektronix, Inc., Beaverton, Oreg.

[22] Filed: Oct. 19, 1972

[21] Appl. No.: 299,311

[52] U.S. Cl. ............................................. 81/9.51
[51] Int. Cl. ............................................. H02g 1/12
[58] Field of Search ........... 81/9.51; 140/1; 30/90.4, 30/90.6; 7/14.1

[56] References Cited
UNITED STATES PATENTS

| | | | |
|---|---|---|---|
| 3,212,369 | 10/1965 | Way | 30/90.6 X |
| 3,283,398 | 11/1966 | Andrew | 81/9.51 X |
| 3,292,462 | 12/1966 | Turecek | 81/9.51 |

Primary Examiner—James L. Jones, Jr.
Assistant Examiner—Roscoe V. Parker
Attorney, Agent, or Firm—Adrian J. LaRue

[57] ABSTRACT

A machine for shearing and stripping cable insulation is provided with a movable block which has openings therethrough for receiving individual insulated conductors that have been slit and splayed at one end of a ribbon cable by slitting and splaying dies. Shearing and stripping members are mounted on the movable block and they are moved relative to the movable block via a slide assembly which moves linkage members pivotally connected to the shearing and stripping members along cam surfaces so that right angled movement of the shearing and stripping members is effected.

14 Claims, 10 Drawing Figures

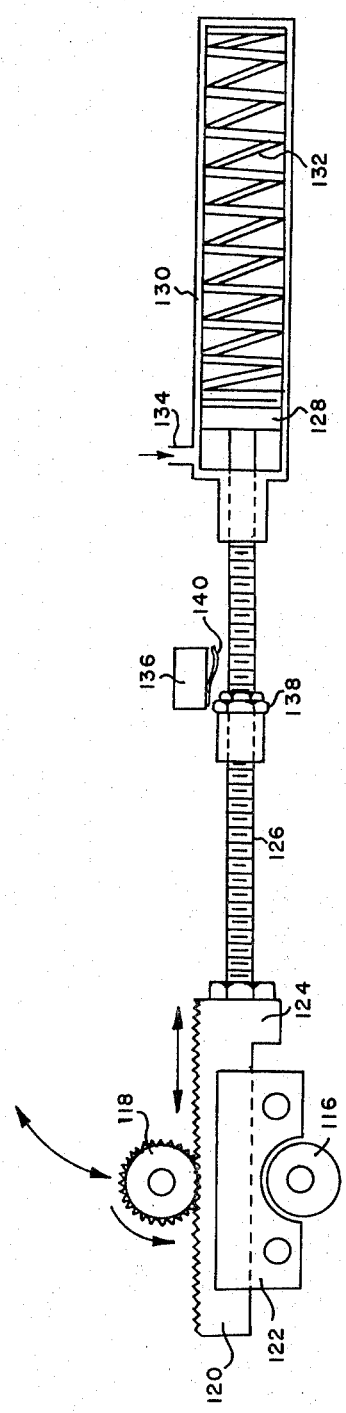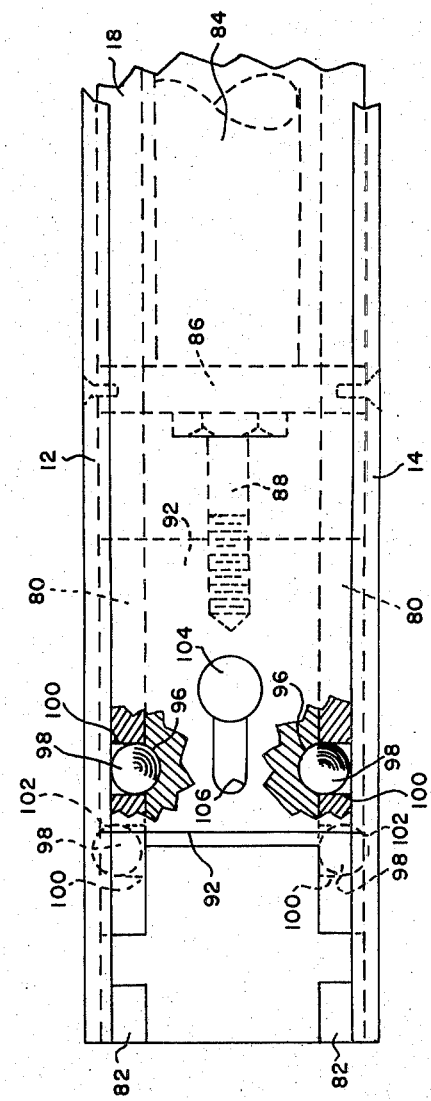

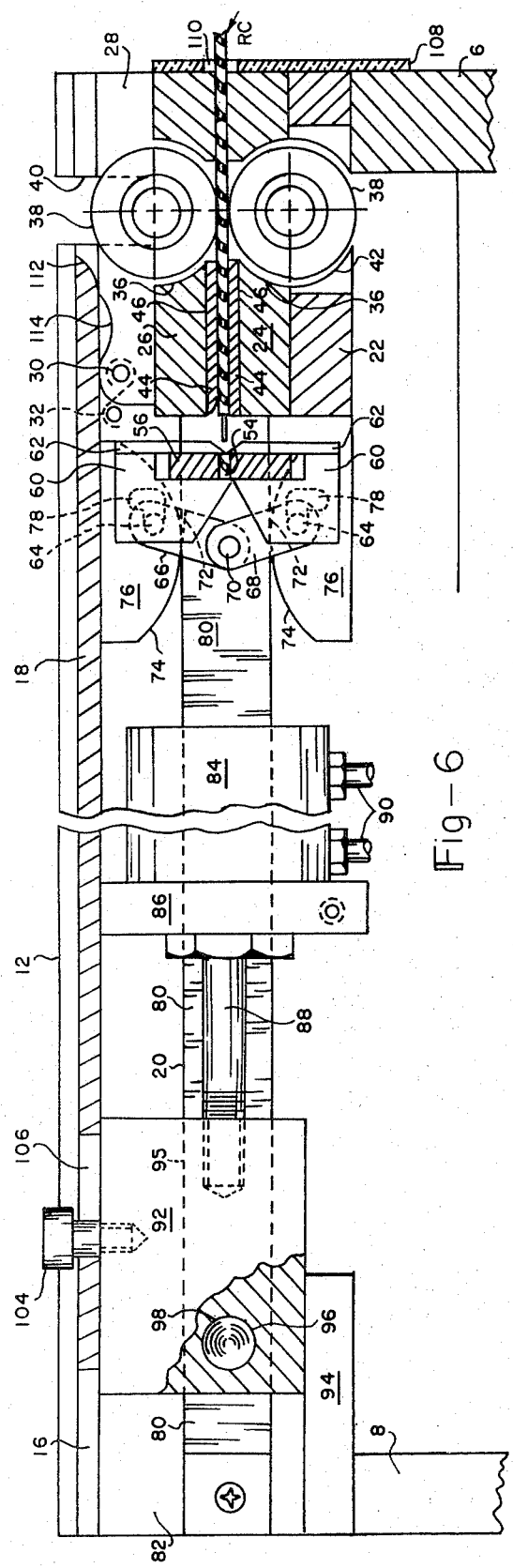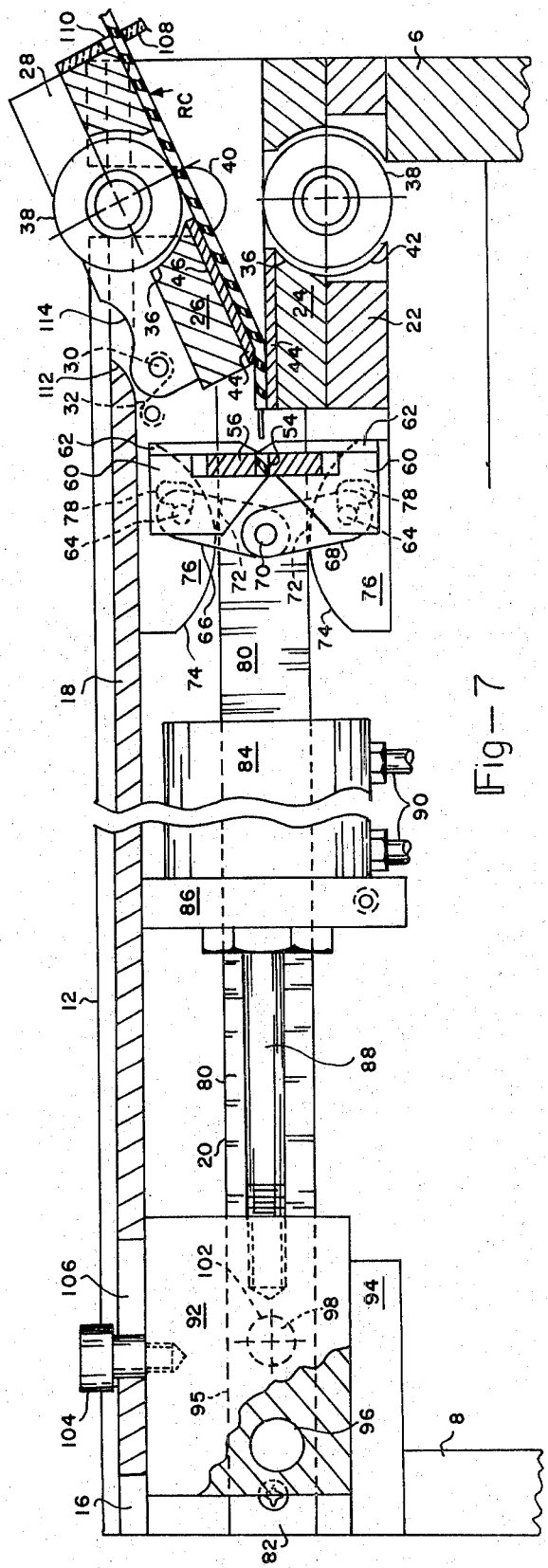

MACHINE FOR SHEARING AND STRIPPING CABLE INSULATION

BACKGROUND OF THE INVENTION

The present invention relates to a machine for shearing and stripping insulation from conductor means and more particularly from slit and splayed ends of a ribbon cable.

U.S. Pat. application Ser. No. 159,792, filed July 6, 1971, and assigned to the present assignee is directed to an insulation-slitting and stripping machine for slitting, splaying, stripping and shearing the electrical conductors at ends of ribbon cable. This machine includes a movable carriage which carries spring-biased stripping and shearing members and they are operated by engagement with cams to strip and shear the conductor ends to the same length or to random lengths as the carriage is moved relative to the slit and splayed conductors.

A large amount of ribbon cable is provided with electrical conductors at their ends having the same length, thus it is not necessary to provide a complex and costly movable carriage and cams to operate spring-biased stripping and shearing members in the manner of Ser. No. 159,792.

An object of the present invention is to provide a machine for shearing and stripping cable insulation whereby the shearing and stripping means operate at substantially right angles over a short distance.

Another object of the present invention is the provision of cam means for obtaining right-angled movement of the stripping and shearing means.

A further object of the present invention is to provide operating means for operating the shearing and stripping means, for maintaining slitting and splaying means in position and for opening the slitting and splaying means for removing a stripped cable therefrom.

An additional object of the present invention is the provision of means provided by the operating means for moving the shearing and stripping means the necessary distance for shearing and stripping electrical conductors and for moving maintaining means to enable the slitting and splaying means to move to an open position for removing a stripped cable therefrom.

BRIEF DESCRIPTION OF THE DRAWINGS

Other objects and advantages of the present invention will become apparent to those skilled in the art from a reading of the following detailed description of the preferred embodiment when taken in conjunction with the accompanying drawings wherein:

FIG. 3 is a top plan view of the latching means enabling the operating means to move the shearing and stripping means and maintaining means the necessary distances;

FIGS. 4-7 are longitudinal cross-sectional views of FIG. 1 illustrating the operation of the machine;

FIG. 10 is a view of the mechanism for controlling the cable feed means.

DESCRIPTION OF THE PREFERRED EMBODIMENT

Figure 8:
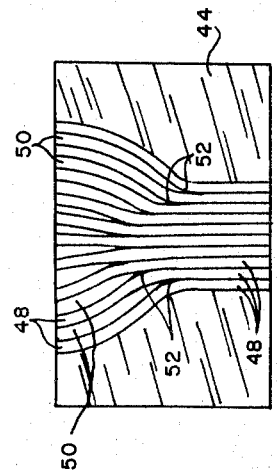
FIG. 8 is a top plan view of one of the slitting and splaying dies.

Turning now to the drawings, machine M is provided with a plate 2 on which a motor 4 and front and back plates 6 and 8 are mounted. Cover member 10 covers electric motor 4 and control circuitry (not shown) and it is secured onto plate 2. Side plates 12 and 14 are secured to plates 6 and 8. Grooves 16 are provided along inner surfaces of side plates 12 and 14 adjacent the top thereof. Plate 18 is movably disposed in grooves 16. Channels 20 are provided on the inner surfaces of side plates 12 and 14.

Stationary support member 22 extends between side plates 12, 14 and has secured thereto stationary plate 24. Movable plate 26 has projections 28 which are pivotally connected to side plates 12, 14 via pins 30 (only one being shown in FIGS. 4-7) to enable plate 26 to be moved into engagement with plate 24. Spring 32 normally maintains plate 26 spaced from plate 24 as shown by FIG. 7.

Plates 24 and 26 have parallel grooves 34 disposed therein which extend from the front of these plates to openings 36 in which serrated feed rollers 38 are disposed. Feed rollers 38 are driven via motor 4. Opposed grooves 34 form a passage or channel, when plates 24 and 26 are disposed opposite each other, for receiving an end of ribbon cable RC which comprises adjacent insulated electrical conductors adhered together along engaging areas of the insulation thereof. A U-shaped slot 40 is located in side plate 12 to enable the shaft of upper feed roller 38 to move therein when plate 26 is pivotally moved away from plate 24. Support 22 also has opening 42 therein to position lower stationary feed roller 38 therein.

Slitting and splaying dies 44 are secured in depressions 46 in plates 24 and 26 and these depressions extend from openings 36 in plates 24 and 26 to the inner ends thereof. Dies 44 have grooves 48, which are in alignment with grooves 34 from the front end of dies 44 to about midway thereof, then grooves 48 curve outwardly from each side of a central axis of dies 44, so that grooves 48, from about midway of dies 44 to the inner ends thereof, are separated by spacers 50, which are provided with sharp edges 52.

Figure 9:
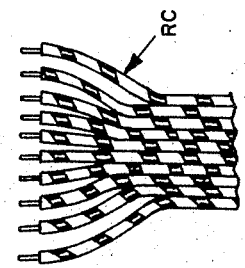
FIG. 9 is a top plan view of an end of a ribbon cable that has been slit, splayed, sheared and stripped by the present invention.
Figure 1:
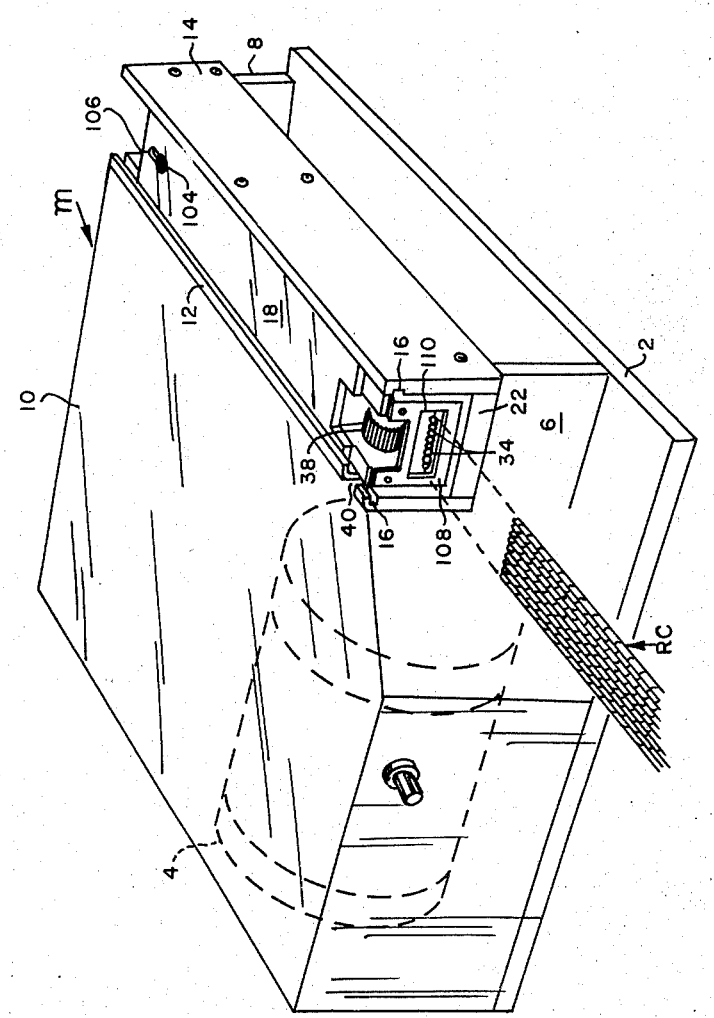
FIG. 1 is a perspective view of the insulation slitting, splaying, shearing and stripping machine according to the present invention.

When dies 44 are in engagement as shown in FIGS. 1 and 4-6, the aligned sharp edges 52 form cutting surfaces to slit the insulation along the areas that join the insulated electrical conductors together, and the insulated electrical conductors, after being slit by the cutting edges 52, are splayed outwardly on each side of the central axis of dies 44, thereby separating the conductors from each other a predetermined distance as shown in FIG. 9. Sharp edges 52 are positioned relative to the front ends of dies 44 by virtue of the radius of curvature that the curved sections of grooves 48 and spacers 50 are spaced such that the splayed conductors are spaced at substantially equal distances from one another.

Thus, with plates 24, 26 in position as shown in FIGS. 1 and 4-6, feed rollers 38 via motor 4 feed an end of ribbon cable RC into slitting and splaying dies 44 when the end of the ribbon cable has been inserted into the channel formed by opposed grooves 34. Slitting and splaying dies slit the insulation along the areas of engagement between adjacent conductors via cutting edges 52 and spacers 50 splay the slit insulated conductors along curved grooves 48 to equally splay the slit conductors as feed rollers 38 feed the end of the ribbon cable along the slitting and splaying area of machine M. Control means to control feed motor 4 to operate feed motor 4 for a predetermined period of time to feed a predetermined length of ribbon cable along the slitting and splaying area of machine M will be described in detail hereinafter.

Figure 2:
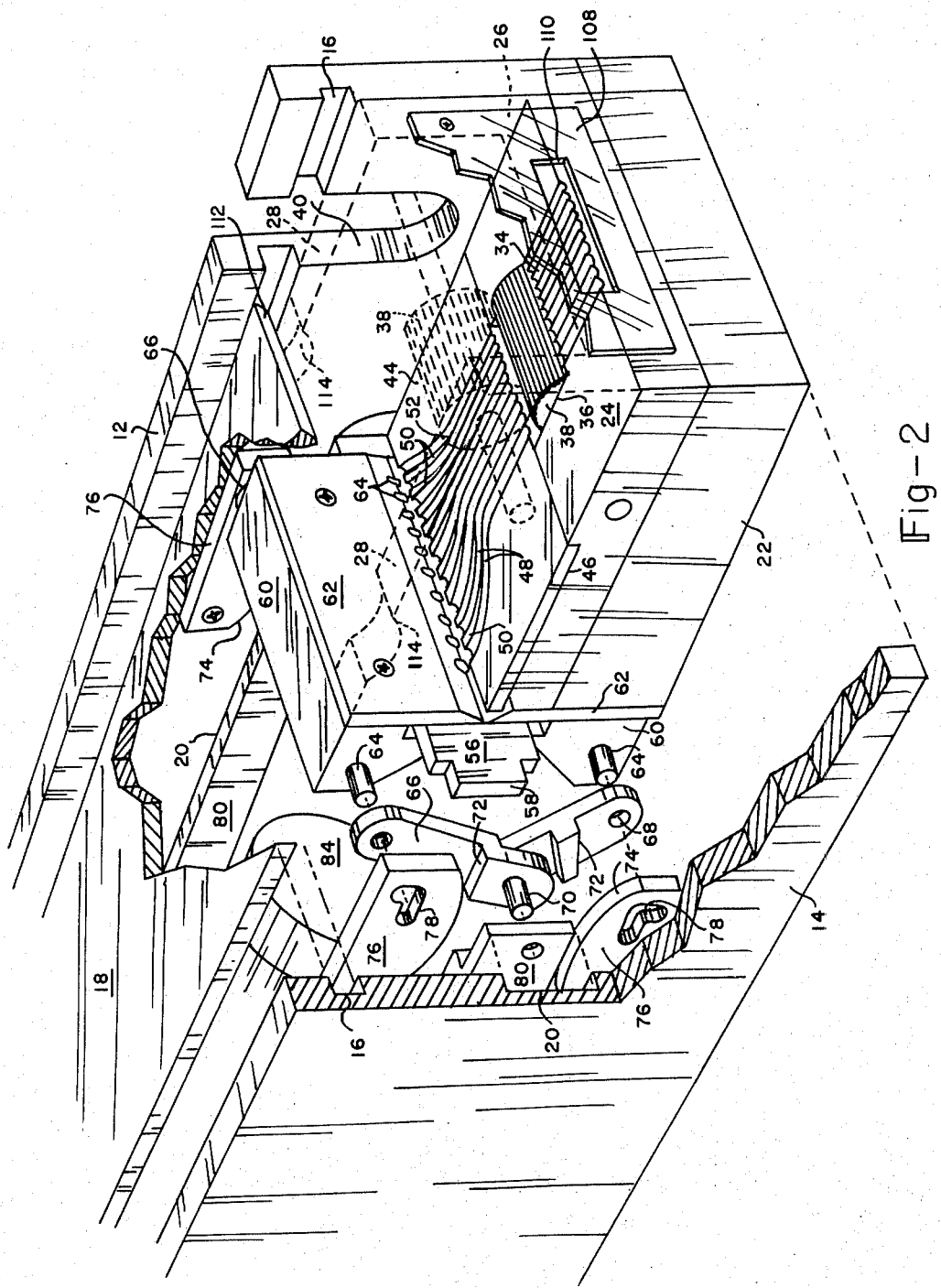
FIG. 2 is a perspective and exploded view of the operating parts of the machine of FIG. 1 with parts broken away.
Figure 4:
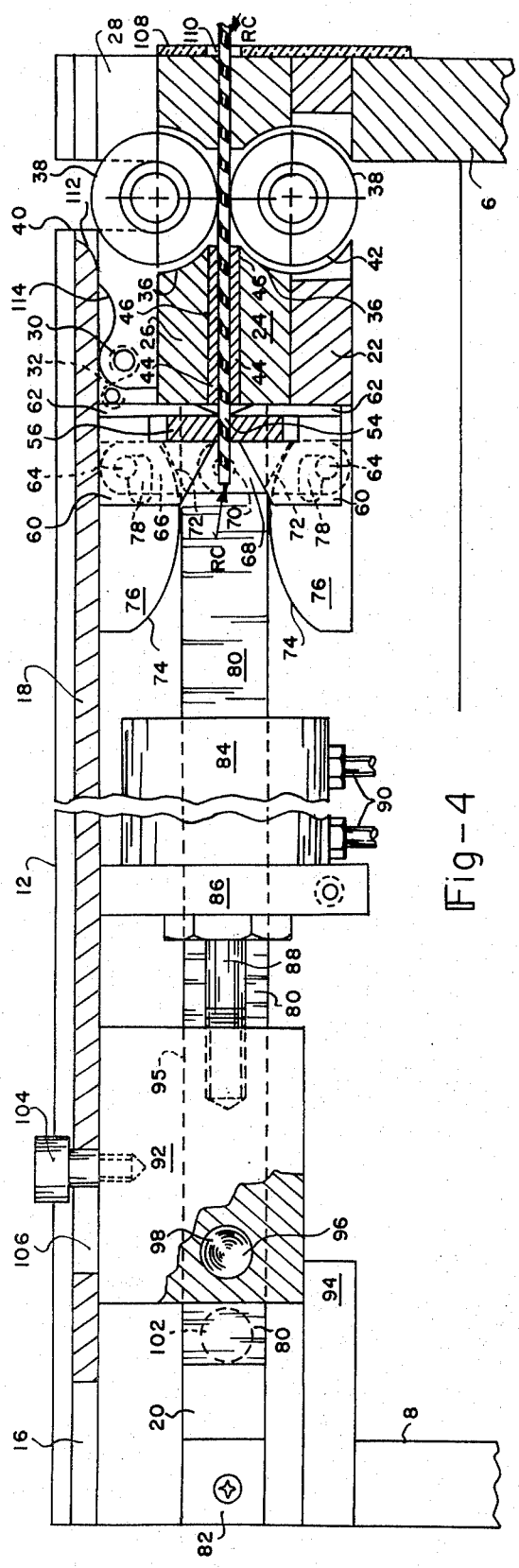

The predetermined length of ribbon cable RC is fed by feed rollers 38 within the slitting and splaying area, and the splayed conductors are moved through holes 54 in block 56 of a shearing and stripping device. The entrances to holes 54 are beveled to facilitate insertion of the splayed conductors thereinto. Projections 58 (only one being shown in FIG. 2) of block 56 are disposed in channels 20 for movement therealong to guide the shearing and stripping device in its forward and rearward movements. L-shaped shearing members 60 are movably mounted on block 56 with their shearing edges being disposed on each side of holes 54 on the inner side of block 56 in their normally inoperative positions as shown in FIG. 4. Stripping members 62 are secured to shearing members 60 and they are provided with arcuate-shaped depressions 64 along the stripping edges in alignment with respective holes 54 in block 56. Stripping members 62 move along the outer surface of block 56 as shearing members 60 move along the inner surface of block 56 so that block 56 guides movement of the shearing and stripping members.

Pivot pins 64 are disposed in each side of shearing members 60. Links 66 and 68 have outer ends pivotally connected onto respective pivot pins 64 and inner ends pivotally connected together via pivot pins 70. Cam surface engaging sections 72 are provided on links 66 and 68, and these sections engage cam surfaces 74 of cams 76 for movement therealong. Pivot pins 64 are disposed in L-shaped slots 78 in cams 76 for movement therein. Pivot pins 70 are connected to the respective ends of linkage arms 80 which are movably disposed in respective channels 20. Stop members 82 are secured in channels 20 to limit movement of linkage arms 80 in channels 20 as shown in FIGS. 4–7.

The operation of the shearing and stripping device is best described by reference to FIGS. 4–7. As shown in FIG. 4, linkage arms 80 are in their forwardmost position whereby pivot pins 70 and 64 and links 66 and 68 are in alignment; pivot pins 64 are disposed in the short legs of L-shaped slots 78 and shearing members 60 and stripping members 62 are positioned outwardly from holes 54 so that the insulated conductors of the ribbon cable RC can extend through holes 54.

Figure 5:
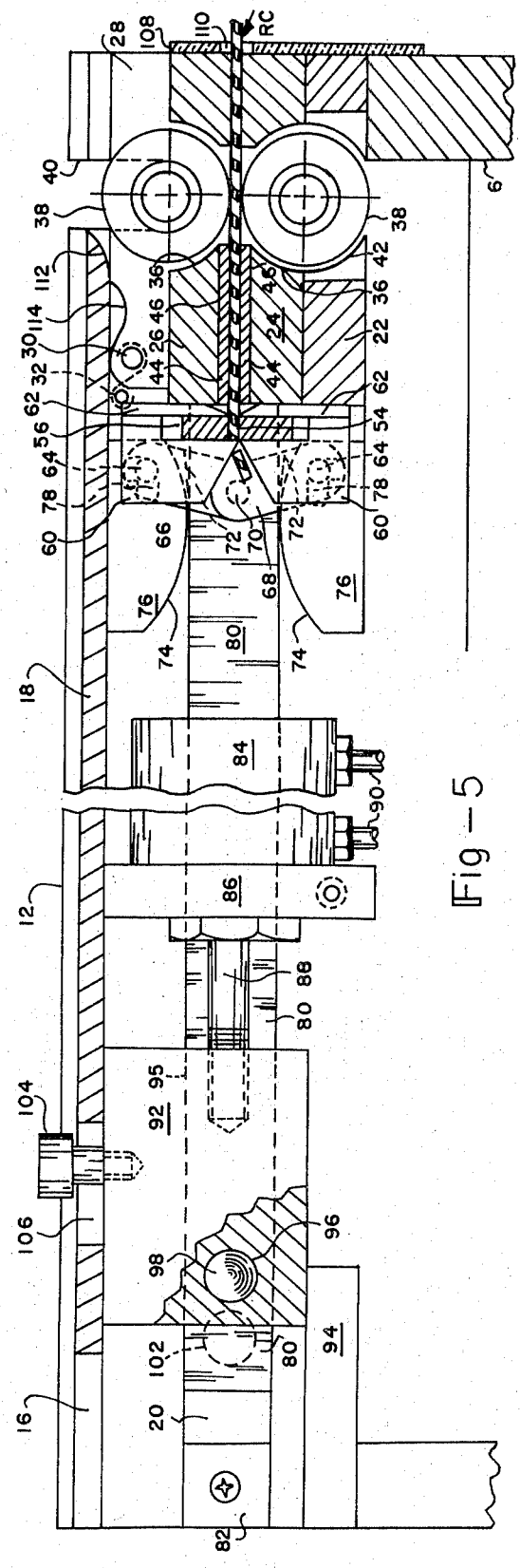

Linkage arms 80 are moved rearwardly via an operating mechanism to be more clearly described hereinafter so that pivot pins 70 move links 66 and 68 outwardly causing pins 64 to be moved inwardly to the arcuate areas at the junctions between the short and long legs of L-shaped slots 78 thereby moving shearing members 60 and stripping members 62 toward each other whereby shearing edges of shearing members 60 shear the ends of the insulated conductors extending beyond the inner surface of block 56 and the mateable arcuated-shaped depressions 64 of stripping members 62 cut through the insulation of each insulated conductor at the outer surface of block 56 as shown in FIG. 5.

Further movement of linkage arms 80 via the operating mechanism against stop members 82 moves the shearing and slitting assembly rearwardly thereby removing the insulation from the ends of the conductors by stripping members 62 being maintained in their stripping position as a result of pins 64 moving in L-shaped slots 78 and cam surface engaging sections 72 moving along in engagement with cam surfaces 74 as shown in FIG. 6 thereby exposing the electrical conductors of the insulated electrical conductors of the ribbon cable RC to provide a slit, splayed, sheared and stripped end of ribbon cable RC as shown in FIG. 9.

The cam surface engaging sections 72 in movement along cam surfaces 74 force pins 64 to move in L-shaped slots 78 thereby causing right-angled movement of the shearing and stripping means. This controlled right-angled movement of the shearing and stripping means provides right-angled movement of the shearing and stripping means over a short distance by single motion to obtain effective shearing and stripping action on the ends of the insulated electrical conductors thereby providing shearing and stripping surfaces normal to the conductor axes and this kind of action eliminates radiussed movement that would provide radiussed shearing and stripping surfaces.

The operating mechanism for operating the shearing and stripping means as shown in FIGS. 3–7 comprises a fluid cylinder 84 mounted onto plate 86. A shaft 88 is connected to the piston (not shown) in cylinder 84 which is driven back and forth therein via fluid through couplings 90. Shaft 88 is also connected to block 92 to move same back and forth therewith along plate 94. Detents 96 are disposed in each side of block 92 and into which balls 98 are disposed. Balls 98 are located in holes 100 in linkage arms 80 and they are maintained within detents 96 via the walls of channels 20 thereby causing block 92 to move linkage arms 80 therealong when block 92 is moved via shaft 88 to operate the shearing and stripping means as hereinabove described.

Block 92 is provided with channels 95 in the sides thereof and into which linkage arms 80 extend for supporting block 92 and for movement of block 92 therealong. When linkage arms 80 engage stops 82, balls 98 move into detents 102 located in the walls of channels 20 thereby permitting block 92 to move freely of linkage arms 80 whereupon bolt 104 in block 92 engages the back end of slot 106 in plate 18 causing plate 18 to move rearwardly with the movement of block 92 so that the front ends of plate 18 moves free of projections 28 thereby permitting movable plate 26 to move away from stationary plate 24 under the action of spring 32, as shown in FIG. 7, to enable the ribbon cable to be removed from between these plates. A plate 108 having a slot 110 is secured to projections 28 and slot 110 moves the cable from the stationary plate 24.

The front ends of plate 18 are provided with radiussed surfaces 112 which engage arcuate areas 114 in projections 28 when plate 18 is moved forwardly upon block 92 being moved to its original operating position via shaft 88 whereupon bolt 104 engages the front end of slot 106 to move plate 18 as block 92 moves forwardly. The engagement of radiussed surfaces 112 with arcuate areas 114 facilitates movement of movable plate 26 into engagement with stationary plate 24 and plate 18 maintains these plates in engagement during the slitting, splaying, shearing and stripping operations as hereinbefore described.

As block 92 moves forwardly under the influence of shaft 88 and cylinder 84, balls 98 move into detents 96 from detents 102 thereby securing linkage arms 80 to block 92 via holes 100, balls 98 and detents 96 so that linkage arms 80 are moved to their original operating positions which means that the shearing and stripping means is also moved to its original operating position as shown in FIG. 4 via linkage arms 80.

FIG. 10 illustrates control means for controlling operation of motor 4 to feed a predetermined length of cable into the slitting and splaying area and the shearing and stripping area of machine M. Shaft 116 of motor 4 is connected to the shaft of lower feed roller 38 to drive same and lower feed roller 38 drives upper feed roller 38 when ribbon cable RC is disposed therebetween to feed the ribbon cable into the slitting and splaying dies 44.

Movement of upper feed roller 38 rotates pinion 118 which is mounted on the same shaft as upper feed roller 38. Pinion 118 meshes with the teeth of rack 120 which is slidably mounted on support 122 which in turn is secured onto sidewall 12 over shaft 116. Stop 124 is provided on rack 120 for engagement with support 122 to limit movement of rack 120 in the left direction when viewing FIG. 10.

One end of threaded rod 126 is secured onto rack 120 while the other end is connected to a piston 128 disposed in cylinder 130. A spring 132 extends between piston 128 and the inner end of cylinder 130. Fluid supply 134 is supplied to cylinder 130 at the same time that fluid supply 90 is supplied to cylinder 84 to maintain piston 128 against the action of spring 132 after pinion 118 has driven rack 120 to a position dependent upon actuation of switch 136 by actuating member 138 engaging lever 140 of switch 136 whereby motor 4 is de-energized.

After block 92 has been driven to its final rearward position to move plate 18 to enable movable plate 26 to move away from plate 24, upper feed roller 38 and pinion 118 are moved along with plate 26 so that pinion 118 is free of rack 120, fluid supply 90 ceases driving block 92 any further in a rearward direction and drives block 92 forwardly to move the shearing and stripping means toward its original position, fluid supply 134 is terminated and spring 132 moves rack 120 to its original position with stop 124 engaged against support 122. When block 92 has been moved to its forward position, plate 18 has moved movable plate 26 into engagement with plate 24 and pinion 118 into engagement with rack 120.

Thus, when actuating member 138 engages lever 140, switch 136 stops motor 4 and this determines how much cable is fed into the machine. Actuating member 138 is adjustable along threaded rod 126 to control actuation of motor 4 thereby determining length of cable to be fed into the machine.

When lever 140 is tripped by actuating member 138 to actuate switch 136 to stop motor 4, a relay (not shown) is actuated to cause fluid supply 90 and 134 to actuate the pistons in cylinders 84 and 130, and, when block 92 has been driven to its rearmost position, the relay is deactivated causing fluid supply 90 to drive block 92 to its forwardmost position and fluid supply 134 to be discontinued.

It will therefore be appreciated that the aforementioned and other desirable objects have been achieved; however, it should be emphasized that the particular embodiments of the invention, which are shown and described herein, are intended as merely illustrative and not as restrictive of the invention.

I claim:

1. A shearing and stripping device for shearing and stripping an end of insulated electrical conductor means comprising:

block means having opening means therethrough;

means for feeding an end of insulated electrical conductor means through said opening means so that part of the end of the conductor means extends outwardly from one surface of said block means;

shearing means disposed along said one surface of said block means for movement therealong for shearing the part of the end of the conductor means that extends outwardly from said one surface;

stripping means disposed along another surface of said block means for movement therealong for shearing through insulation of the electrical conductor means to the conductive means thereof;

operating means connected to said shearing and stripping means for moving same along said surfaces;

and means provided by said operating means for moving said shearing and stripping means along a controlled right-angled path to shear the part of the conductor means while simultaneously shearing through the insulation during movement of the shearing and stripping means in a direction normal to the conductor means and to strip the sheared insulation from the end of the conductor means during movement of the shearing and stripping means in a direction parallel to the position of the conductor means.

2. A shearing and stripping device according to claim 1 wherein said shearing and stripping means are connected together to move as a unit.

3. A shearing and stripping device according to claim 1 wherein said means provided by said operating means for moving said shearing and stripping means along said controlled right-angled path comprises:

cam means having cam surface means and L-shaped slot means;

pivot means of said shearing means disposed in said slot means;

link means having one end connected onto said pivot means, said operating means connected to another end of said link means;

cam surface-engaging means provided by said link means for engageable movement along said cam surface means to move said pivot means in said L-shaped slot means when said operating means is operated thereby defining said right-angled path.

4. A machine for slitting, splaying, shearing and stripping an end of ribbon cable means having insulated electrical conductors, comprising:

means for feeding the end of the ribbon cable means into a slitting and splaying area;

means in said slitting and splaying area for slitting the end of the ribbon cable means into individual insulated electrical conductors;

means in said slitting and splaying area for splaying the slit individual insulated electrical conductors;

shearing means for shearing ends of the individual insulated electrical conductors;

stripping means for stripping insulation from ends of the individual insulated electrical conductors; and operating means connected to said shearing and stripping means for operating same including means for moving said shearing and stripping means along a controlled right-angled path to shear ends of the individual electrical conductors while simultaneously shearing through the insulation during movement of said shearing and stripping means in one direction and to strip the sheared insulation from the ends of the individual electrical conductors during movement of said shearing and stripping means in a direction opposite to that of said one direction.

5. A machine according to claim 4 wherein said slitting and splaying means comprise:

stationary and movable sections, and means provided by said operating means to maintain said stationary and movable sections in engagement during the slitting, splaying, shearing and stripping operations being performed by said slitting, splaying, shearing and stripping means and to permit said movable section to be moved away from said stationary section upon completion of the slitting, splaying, shearing, and stripping operations by said slitting, splaying, shearing and stripping means.

6. A machine according to claim 4 wherein block means is provided for mounting said shearing and stripping means for movement along front and rear surfaces thereof by said operating means, said block means having holes therethrough for receiving the individual slit and splayed conductors.

7. A machine according to claim 4 wherein said means for moving said shearing and stripping means along said controlled right-angled path comprises:

link means pivotally connected between pivot means of said shearing means and said operating means;

cam means having L-shaped slot means and cam surface means, said pivot means of said shearing means disposed within said L-shaped slot means for movement therewithin; and cam surface-engaging means provided by said link means for engagement with said cam surface means.

8. A machine according to claim 4 wherein said operating means comprises:

linkage arm means pivotally connected to said moving means;

block means movable along said linkage arm means;

fluid-operated means connected to said block means to move said block means in a rearward and forward direction; and coupling means between said block means and said linkage arm means coupling said block means and said linkage arm means together.

9. A machine according to claim 8 wherein said coupling means comprises ball and detent means.

10. A machine according to claim 4 wherein said feeding means comprises:

upper and lower feed roller means;

motor means connected to said lower feed roller means to drive same, said upper feed roller means being operated by said lower feed roller means when the ribbon cable means is moved therebetween thereby causing said feed roller means to feed the ribbon cable means into said slitting and splaying means; and control means operatively connected to said feed roller means for controlling the operation of said motor means.

11. A machine according to claim 10 wherein said control means comprises:

pinion means connected to said upper feed roller means;

rack means meshable with said pinion means for driving said rack means;

switch means connected to said motor means;

means provided by said rack means for actuating said switch means to deactivate said motor means; and means for maintaining said rack means at its switch-operating position until after operation of said shearing and stripping means.

12. A machine for preparing an end of electrical cable means having side-by-side electrical conductors encased in insulation means comprising:

slitting and splaying means including lower stationary slitting and splaying means and upper movable slitting and splaying means;

means maintaining said upper and lower slitting and splaying means in engagement to slit and splay the insulation means into individual insulated electrical conductors at the end of the cable means;

means for shearing ends of the individual insulated electrical conductors;

means for stripping insulation from each of the individual insulated electrical conductors thereby baring the electrical conductors; and operating means connected to said shearing and stripping means to operate same and for moving said maintaining means to a position after said shearing and stripping means have been operated to permit said upper slitting and splaying means to move away from said lower slitting and splaying means.

13. A machine according to claim 12 wherein said operating means is provided with means to couple said shearing and stripping means to said operating means during operation of said shearing and stripping means and to decouple said shearing and stripping means from said operating means after operation of said shearing and stripping means.

14. A machine according to claim 12 wherein means is provided on said upper slitting and splaying means to carry the cable means therewith when said upper slitting and splaying means moves away from said lower slitting and splaying means.

* * * * *